United States Patent [19]

Sauer et al.

[11] 4,087,596

[45] May 2, 1978

[54] POSITIVE ELECTRODE FOR AIR/ZINC ELEMENTS

[75] Inventors: Hans Sauer, Idstein-Walsdorf; Wolfgang Kloss, Eppstein, both of Germany

[73] Assignee: Varta Batterie Aktiengesellschaft, Germany

[21] Appl. No.: 796,015

[22] Filed: May 11, 1977

[30] Foreign Application Priority Data

Jun. 16, 1976 Germany .............................. 2626975

[51] Int. Cl.² ............................................. H01M 4/64
[52] U.S. Cl. .................................... 429/209; 429/234; 429/239
[58] Field of Search ................. 429/27, 209, 212, 218, 429/233, 234, 237, 239, 241, 244, 245

[56] References Cited

U.S. PATENT DOCUMENTS

| 3,437,529 | 4/1969 | Honer | 429/119 |
| 3,840,407 | 10/1974 | Yao et al. | 429/27 |

*Primary Examiner*—Anthony Skapars
*Attorney, Agent, or Firm*—Weiser, Stapler & Spivak

[57] ABSTRACT

The positive electrode for an air/zinc element is a depolarizer mass attached to a perforated plastic carrier with interposition of a conductive foil and a metal foil take-off conductor, both also perforated. The perforations in the plastic carrier are in the form of hollow rivets extending toward the foils, the foils are engaged by their own perforations concentrically upon said rivets, and the rivets have outwardly protruding collars extending over the foils, whereby the foils are attached and all perforations are aligned.

9 Claims, 3 Drawing Figures

POSITIVE ELECTRODE FOR AIR/ZINC ELEMENTS

The invention relates to a positive electrode for air/zinc elements in which the depolarizer mass is applied to a perforated plastic carrier with interposition of a conductive foil and a metal foil as take-off conductor, which are also both perforated.

Air/zinc elements are known in the most varied forms. In them, the negative zinc electrode is placed opposite a porous carbon pressed body, the depolarizer for the oxygen of the air, serving as positive electrode. As the electrolyte there are used not only the aqueous ammonium chloride solution having zinc chloride additive, which are known from manganese dioxide elements, but also solutions with manganese (II) chloride.

Because of corrosion risk, to which the metallic take-off conductor of positive electrodes is subject in conventional electrolytes, centrally positioned carbon rods are used in their stead for cylindrical cells. In plate cells which, among other things, have advantages over cylindrical cells due to large electrode cross-sections and short diffusion paths for the ambient oxygen, electron take-off by means of round carbon rods is not appropriate for geometric reasons, because these contact the positive electrode plate only along a line defined on its surface.

Therefore, flat take-off conductors are used for positive electrodes in plate cells, such as are known for example from German Pat. No. 1,187,696, which corresponds to U.S. Pat. No. 3,279,948. These consist of the combination of a metal foil with a plastic foil that has been rendered conductive. The metal foil performs the electron transport to the external cell contact, but is protected from direct corrosive attack from the direction of the positive electrode mass by the intervening plastic foil, for example polyisobutylene rendered conductive by graphite.

Since the metal foil serving as current take-off faces the side oriented toward the air, the ambient oxygen must pass through it and through the conductive foil to reach the reaction zone itself, namely the three phase region within the electrode pressed body. Both foils are therefore provided with aligned holes which afford adequate air penetration. The holes in the metal foil have greater diameter than those in the conductive foil. In this manner, as viewed from the electrode pressed body all larger holes are overlapped and the metal foil menaced by corrosion is nowhere exposed.

A disadvantage of such a foil assembly is that the different hole diameters require the two foils to be manufactured in separate manufacturing steps and then glued together. In production, a glueing process is not a desirable procedure, not least because the organic solvents used in the glues are potentially deleterious to health.

In prior German Pat. Application P 26 15 921 published Oct. 13, 1977, and corresponding to co-pending U.S. Pat. Application Ser. No. 780 435, filed Mar. 23$^{rd}$, 1977, an air/zinc flat cell is disclosed in which a plate-like negative zinc electrode is provided between two positive air electrodes and together these are positioned within a plastic housing. The housing consists of two half-shells with perforated outer walls in each of which there is provided a conductive foil and a take-off conductor as well as the positive electrode pressed body. The half-shells are connected with each other with interposition of separators as well as of the negative plate-like zinc electrode which has a plastic frame around its edge. The half-shells have electrolyte insertion apertures and conductor passage apertures and the top edge of the half-shell is provided with a tub-shaped recess with apertures for electrolyte passage and which extends over a portion of the length of the half-shell while leaving room for the conductor passages. Between the inner wall of each half-shell containing the positive electrode body and the conductive foil there is positioned a perforated lead foil. In such an arrangement, too, the perforated plastic carrier, the perforated lead foil, and the perforated conductive foil must be so positioned upon each other that the perforations are lined up. By increased size of perforations of the lead foil, corrosion of that foil is prevented. The superposition and, if required, glueing together of these components raises the costs of their manufacture.

Accordingly, it is an object of the invention to facilitate the assembly of the individual components of the positive electrode and to attach the metal foil as well as the conductive foil to the plastic carrier in such a manner that the metal foil has no contact with the ambient oxygen, the electrolyte, and the depolarizer mass and thereby is protected from corrosion.

This and other objects which will appear are achieved by providing the air holes of the plastic carrier with protrusions in the form of hollow rivets with outwardly protruding collars, by which the foils are affixed to the plastic carrier with concentrically superposed holes.

It is particularly desirable to push additional pins protruding from the plastic carrier through specially perforated slots in both foils. These then extend into the depth of the active mass. This substantially enhances the solidity of the pressed body, as well as the adhesion to the conductive foil. This makes it possible to reduce the compression density of the electrode without sacrifice of solidity, thereby saving material, as well as achieving a higher pore volume for the electrode which is desirable for the current producing reaction.

For further details reference is made to the discussion which follows, in the light of the accompanying drawings wherein FIG. 1 is a cross-section through a fragment of the plastic carrier in its initial state;

The same reference numerals is used in the different figures to denote similar elements.

Figure 1:
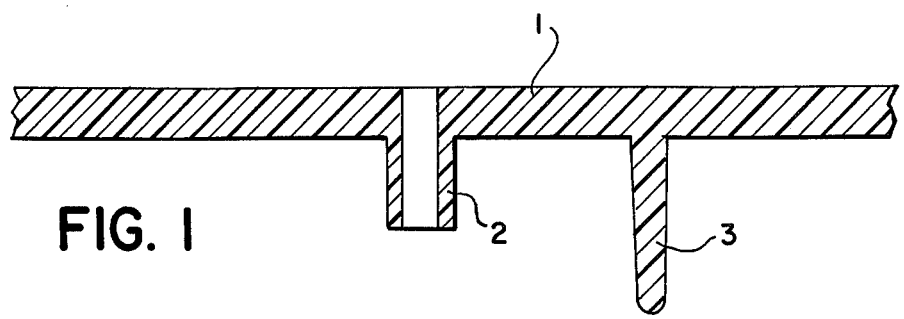

Referring to FIG. 1, this shows a fragment of a perforated plastic carrier 1 with protrusions 2 in the shape of hollow rivets and pins 3 in accordance with the invention. This plastic carrier may, for example, be produced by injection molding.

Metal foil 4, particularly a lead foil, and conductive foil 5 are engaged upon pins 3 and, guided thereby, are pressed against carrier 1 whereby their holes snugly enclose hollow-rivet shaped protrusions 2.

Figure 2:
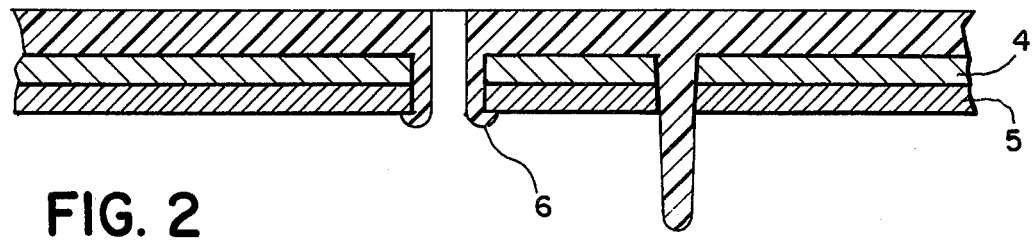
FIG. 2 is a view of the same object but with foils attached.

By subsequent after-treatment of the hollow-rivet shaped protrusions 2 using heat, pressure or ultrasonics, during which these are provided with an outwardly protruding collar 6 as shown in FIG. 2, the foils are reliably affixed to the carrier. In particular, metal foil 4 is hermetically sealed against any access by air.

Figure 3:
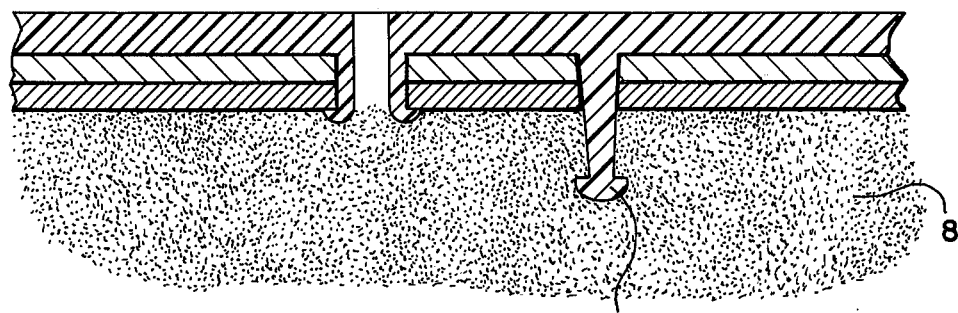
FIG. 3 is a view of the same object with depolarizer mass also in place.

Simultaneously with formation of collars 6, pins 3, which are initially formed with conical shapes for reasons of injection molding technology, are provided with a knob-shaped thickened portion 7 as shown in FIG. 3, also by heating, pressure or ultrasonics.

When the positive depolarizer mass 8 is then pressed onto the carrier which has been prepared as described above, the knob-shaped thickened portion 7 acts as a reverse hook and thereby further reenforces the attachment of the pressed body.

From the manufacturing standpoint, the attachment of metal foil and conductive foil to the carrier in accordance with the invention has the further substantial advantage that both foils can be perforated in a single process because the perforations have the same hole diameter.

We claim:

1. A positive electrode for air/zinc elements having a depolarizer mass attached to a perforated plastic carrier with interposition of a conductive foil and a metal foil take-off conductor which are also both perforated, wherein
    the perforations in the plastic carrier are in the form of hollow rivets extending toward the foils,
    the foils are engaged by their own perforations concentrically upon said rivets, and
    the rivets have outwardly protruding collars extending over the foils, whereby the foils are attached and their perforations aligned.

2. The electrode of claim 1 wherein
    the diameters of the perforations in both foils are substantially equal.

3. The electrode of claim 2 wherein
    the perforations in both foils are produced in a single operation.

4. The electrode of claim 1 wherein
    the perforations in the foils fit snugly around the rivets.

5. The electrode of claim 1 wherein
    the collar is formed by operating on the rivets after the foils have been engaged on the rivets.

6. The electrode of claim 1 wherein
    the plastic carrier has pins extending through the foils into the depolarizer mass.

7. The electrode of claim 6 wherein
    the pins have knob-shaped ends for anchoring the depolarizer mass.

8. The electrode of claim 7 wherein
    the knob-shaped ends of the pins are formed simultaneously with the collars on the rivets.

9. The electrode of claim 8 wherein
    the pins have shapes which taper down in the direction of the knob-shaped ends.

* * * * *